United States Patent [19]
Takeya et al.

[11] Patent Number: 5,790,493
[45] Date of Patent: Aug. 4, 1998

[54] OPTICAL RECORD MEDIUM JUDGING METHOD AND APPARATUS AND FOCUS SERVO CONTROLLING METHOD AND APPARATUS

[75] Inventors: Noriyoshi Takeya, Tokorozawa; Kouki Sai, Tokyo-to, both of Japan

[73] Assignee: Pioneer Electronic Corporation, Tokyo-to, Japan

[21] Appl. No.: 725,731

[22] Filed: Oct. 4, 1996

[30] Foreign Application Priority Data

Oct. 6, 1995 [JP] Japan .................................. 7-260569

[51] Int. Cl.⁶ ...................................................... G11B 7/09
[52] U.S. Cl. ............................ 369/58; 369/44.29; 369/94
[58] Field of Search ............................ 369/44.27, 44.25, 369/44.29, 44.26, 54, 58, 94, 44.37

[56] References Cited

U.S. PATENT DOCUMENTS

| | | | |
|---|---|---|---|
| 5,003,521 | 3/1991 | Yoshida et al. | 369/54 |
| 5,263,011 | 11/1993 | Maeda et al. | 369/94 |
| 5,381,392 | 1/1995 | Hira | 369/58 |
| 5,446,565 | 8/1995 | Komma et al. | 369/94 |
| 5,671,203 | 9/1997 | Ra | 369/58 |

*Primary Examiner*—Thang V. Tran
*Attorney, Agent, or Firm*—Ladas & Parry

[57] ABSTRACT

The distances from external surfaces to information record surfaces of the optical record mediums of various types are different from each other. An optical record medium judging method of judging the types of the optical record mediums is provided with the steps of: irradiating an information record surface of an optical record medium to be reproduced with a plurality of light beams to be focused on different positions on one optical axis; moving, so as to change a relative distance parallel to said one optical axis between an objective lens for prescribing focal points of the plurality of light beams respectively and the information record surface, the objective lens; receiving a plurality of reflection lights of the plurality of light beams reflected from the information record surface respectively, associated with a change of the relative distance; generating a plurality of focus error signals on the basis of the plurality of received reflection lights respectively; and judging a type of the optical record medium by comparing levels of the generated focus error signals respectively with a predetermined standard level.

12 Claims, 6 Drawing Sheets

FOR CD

OPTICAL RECORD MEDIUM JUDGING METHOD AND APPARATUS AND FOCUS SERVO CONTROLLING METHOD AND APPARATUS

BACKGROUND OF THE INVENTION

1. Field of the Invention

The present invention is related with a reproducing apparatus in a case of reproducing, by using one reproducing apparatus, information from a plurality of types of optical record mediums, such as optical disks of various types and the like, to which the information is recorded by a phase pit and the like or a magnetic way, and more particularly, it is related with a judging method and apparatus for judging the type of the optical record medium to be reproduced. It is further related with, in an optical pickup for irradiating a light beam as an information reproducing light to the plurality of types of optical record mediums and reproducing the above mentioned information by use of the reflection light, a focus servo controlling method and apparatus for carrying out a focus servo control in order to beam-condense (focus) the light beam which has an optimal size at a reproducing position of the optical record medium.

2. Description of the Related Art

There is a so-called CD/LD compatible reproducing apparatus which can reproduce a CD (Compact Disk) and a LD (Laser Disk) with one reproducing unit. In this CD/LD compatible reproducing apparatus, a distance from a record medium surface to an information record surface (namely, a thickness of a protecting layer) is common in the CD and the LD (e.g. 1.2 mm in common). Thus, it is possible to reproduce both of these optical disks by using an optical pickup in which a light beam is condensed to one focal point.

In this CD/LD compatible reproducing apparatus, as a rising operation prior to reproducing the record information, a focus servo control is needed for carrying out an optimal focus servo control corresponding to the type of the optical disk to be reproduced. However, in this case, for example, in order to use a conventionally general astigmatism method to thereby carry out the focus servo control, prior to carrying out the focus servo control, it is necessary to do a so-called "focus search action" for setting a standard position when carrying out the appropriate focus servo control. This focus search action moves an optical pickup in a direction perpendicular to the optical disk by a predetermined length to thereby detect an optimal focus position on the basis of a focus error signal (S-shaped signal) outputted at that time. In the above mentioned CD/LD compatible reproducing apparatus, since distances from surfaces of the optical disks to information record surfaces are equal to each other in the CD and the LD, a common action is carried out in both cases in doing the focus search action. Further, in this focus search action, in order to compensate an output power change due to the variation of a reflectivity of the optical disk, the contamination associated with aging of the optical pickup and the like, or a change in a focus servo gain due to the variation of a sensitivity of an optical detector during an optical pickup action and the like, a process is carried out which detects a peak value of the above mentioned focus error signal and re-sets the servo gain corresponding to the peak value.

In the above mentioned CD/LD compatible reproducing apparatus, in a case of judging whether the optical disk mounted in the reproducing apparatus is the CD or the LD, it is judged whether or not the focus servo is locked by moving the optical disk into an area located outside the CD and inside the LD and rotating the optical disk by utilizing a diameter difference between the CD and the LD. Namely, if it is locked, the optical disk is judged as the LD. If it is not locked, the optical disk is judged as the CD.

On the other hand, a DVD (Digital Video Disk) is being developed which greatly improves a memory capacity as compared with a conventional CD and is a high density record medium to which one movie or the like can be recorded. Especially, a CD/DVD compatible reproducing apparatus is being developed which can reproduce both the DVD and the CD.

When comparing a configuration of the CD with that of the DVD, from the viewpoint of a high density request, the thickness of the protecting layer of the DVD is set to a thickness (0.6 mm) approximately half of that of the protecting layer of the CD. Thus, if trying to reproduce both of these optical disks by using the optical pickup having one focal point, for example, if trying to condense a light beam so as to be optimal for the DVD, since the protecting layer of the CD through which the light beam is passed is thicker than that of the DVD, aberration such as spherical aberration and the like is generated in the light beam. This results in a problem that the light beam can not be optimally condensed with respect to the CD.

In order to solve this problem, one method may be considered in which an aberration correcting element is inserted into an optical path of the light beam, depending on the type of the optical disk to be reproduced. However, this method will require a mechanical device which puts and retracts the aberration correcting element into and from the optical path on the basis of the type of the optical disk to be reproduced. Thus, this method is not suited for miniaturization of the optical pickup.

A bifocal lens is developed through which it is possible to irradiate two light beams focused on different positions on one straight line. This bifocal lens is explained with reference to FIGS. 6A and 6B.

Figure 6A:
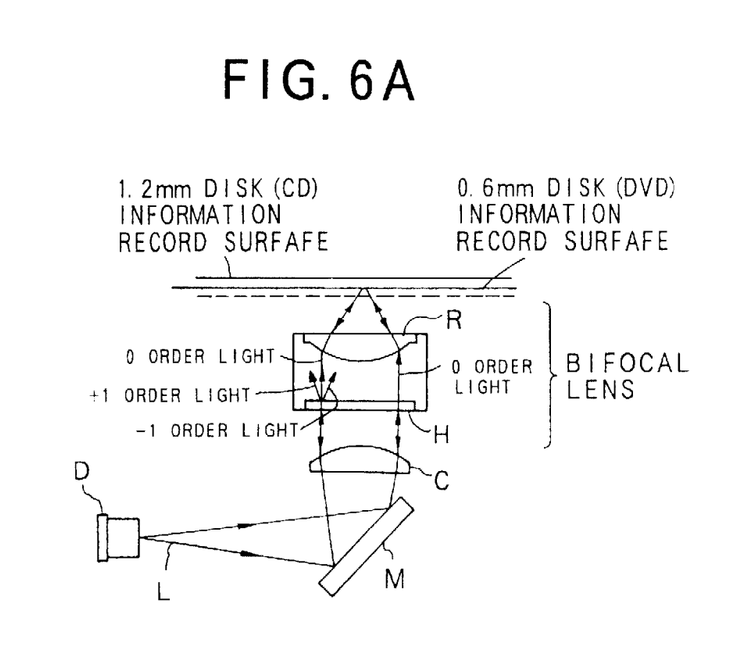
FIG. 6A is a block diagram showing a configuration of a bifocal lens in one operating status.
Figure 6B:
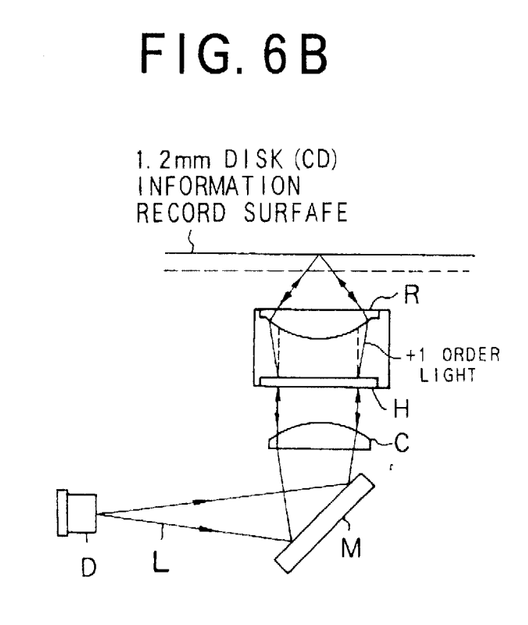
FIG. 6B is a block diagram showing a configuration of a bifocal lens in another operating status.

As shown in FIG. 6A, the bifocal lens comprises a diffraction grating H and an objective lens R arranged on one optical path. A light beam L made into a parallel light by a collimator lens C is divided into three beams of a 0 order light, a +1 order light and a −1 order light by the diffraction grating H. By using a difference between optical path lengths of the 0 order light and the +1 order light among them, the 0 order light and the +1 order light are made focused on different positions on one straight line. More actually, this bifocal lens is adapted such that the +1 order light is focused on a position further from the objective lens R than the 0 order light, and that the 0 order light is optimally beam-condensed on the information record surface of the DVD (e.g. 0.6 mm from the disk surface), and also as shown in FIG. 6B, the +1 order light is optimally beam-condensed on the information record surface of the CD (e.g. 1.2 mm from the disk surface).

If using this bifocal lens, it is possible to use one optical pickup to thereby reproduce both of the CD and the DVD.

Even in a case of using the above mentioned bifocal lens to thereby reproduce information, similarly to the conventional CD/LD compatible reproducing apparatus, the focus search action is required.

From the viewpoint of a high density request, the DVD is superior in linear velocity of record information to the CD. Thus, the focus servo gain and a focus servo frequency band in the focus search action are different between the CD and the DVD. For the focus servo frequency band, more actually, it is necessary that the DVD is widely set on a higher frequency side than the CD.

If trying to apply the conventional focus search action to such a CD/DVD compatible reproducing apparatus, it is necessary to verify two different focus servo gains and focus servo frequency bands and set the focus servo gain and the focus servo frequency band which are adapted to the mounted optical disk. This results in a problem of requiring an unnecessary time for the focus servo action.

Even when judging the optical disk mounted in the CD/DVD compatible reproducing apparatus, since a radius of the CD is equal to that of the DVD, there is a problem that a conventional disk judging method can not be used. In combination with this problem and the above mentioned problem in setting the focus servo gain and the focus servo frequency band, judging of the optical disk and setting of the focus servo gain and the focus servo frequency band are separately carried out, so that it is impossible to carry out a rapid rising operation at the beginning of reproducing the record information, which is another problem.

SUMMARY OF THE INVENTION

It is therefore an object of the present invention to provide an optical record medium judging method and apparatus, and a focus servo controlling method and apparatus, which can carry out a rapid rising operation in a compatible reproducing apparatus for reproducing optical record mediums of various types e.g. a CD/DVD compatible reproducing apparatus.

The above object of the present invention can be achieved by an optical record medium judging method of judging types of optical record mediums, which distances from external surfaces thereof to information record surfaces thereof recorded with record information are different from each other. The optical record medium judging method is provided with the steps of: irradiating an information record surface of an optical record medium to be reproduced with a plurality of light beams to be focused on different positions on one optical axis; moving, so as to change a relative distance parallel to said one optical axis between an objective lens for prescribing focal points of the plurality of light beams respectively and the information record surface, the objective lens; receiving a plurality of reflection lights of the plurality of light beams reflected from the information record surface respectively, associated with a change of the relative distance; generating a plurality of focus error signals on the basis of the plurality of received reflection lights respectively; and judging a type of the optical record medium by comparing levels of the generated focus error signals respectively with a predetermined standard level.

According to the optical record medium judging method of the present invention, the information record surface of the optical record medium is irradiated with a plurality of light beams to be focused on different positions on one optical axis. Then, the objective lens is moved, so that the relative distance parallel to the optical axis between the objective lens and the information record surface is changed. Then, a plurality of reflection lights of the plurality of light beams reflected from the information record surface respectively are received in association with the change of the relative distance. Then, a plurality of focus error signals are generated on the basis of the plurality of received reflection lights respectively. Finally, the type of the optical record medium is judged by comparing levels of the generated focus error signals respectively with a predetermined standard level.

Accordingly, it is possible to judge the types of the optical record mediums even if the diameters thereof are same to each other as in the case of the CD and the DVD. Namely, as long as the distances between the external surfaces to the information record surfaces are different from each other, the types of the optical record mediums can be judged according to the optical record medium judging method of the present invention.

As one aspect of the optical record medium judging method of the present invention, the optical record mediums include first and second optical record mediums which distances from the external surfaces thereof to the information record surfaces thereof are different from each other. The irradiating step is provided with the steps of irradiating the information record surface with a first light beam to reproduce the record information from the first optical record medium, and irradiating the information record surface with a second light beam to reproduce the record information from the second optical record medium, the second light beam having a focal point farther from the objective lens than the first light beam. The receiving step is provided with the steps of receiving a first reflection light of the first light beam reflected from the information record surface, and receiving a second reflection light of the second light beam reflected from the information record surface. The focus error signal generating step is provided with the steps of generating a first focus error signal on the basis of the received first reflection light, and generating a second focus error signal on the basis of the received second reflection light. The judging step is provided with the steps of judging the type of the optical record medium as the first optical record medium if at least one of the levels of the first and second focus error signals is equal to or higher than the predetermined standard level, and judging the type as the second optical record medium if both of the levels are lower than the predetermined standard level.

According to this aspect of the present invention, the information record surface is irradiated with the first light beam to reproduce the record information from the first optical record medium, and the information record surface is irradiated with the second light beam to reproduce the record information from the second optical record medium. Here, the second light beam has a focal point farther from the objective lens than the first light beam. Then, the first reflection light of the first light beam reflected from the information record surface is received, and the second reflection light of the second light beam reflected from the information record surface is received. Then, the first focus error signal is generated on the basis of the received first reflection light, and the second focus error signal is generated on the basis of the received second reflection light. Finally, the type of the optical record medium is judged as the first optical record medium if at least one of the levels of the first and second focus error signals is equal to or higher than the predetermined standard level, and the type is judged as the second optical record medium if both of the levels are lower than the predetermined standard level.

Accordingly, it is possible to judge the first and second optical record mediums even if the diameters of the first and second optical record mediums are same to each other as in the case of the CD and the DVD. Namely, as long as the distances between the external surfaces to the information record surfaces are different between the first and second optical record mediums, the types of the optical record mediums can be judged according to this aspect of the present invention.

In this aspect of the present invention, in the irradiating step, the first light beam may be a 0 order light generated by a bifocal lens, and the second light beam may be a +1 order light generated by the bifocal lens. Thus, it is possible to irradiate the information record surface with a plurality of light beams by employing a relatively simple construction i.e., the bifocal lens, to the optical system while the optical record medium judging operation including the focus search action can be efficiently and reliably performed.

The above object of the present invention can be also achieved by a focus servo controlling method of judging types of optical record mediums, on which record informations are recorded at linear velocities different from each other, and setting a focus servo gain and a focus servo frequency band corresponding to each of the types of the optical record mediums. The focus servo controlling method is provided the steps of: irradiating an information record surface recorded with record information of an optical record medium to be reproduced with a plurality of light beams to be focused on different positions on one optical axis; moving, so as to change a relative distance parallel to said one optical axis between an objective lens for prescribing focal points of the plurality of light beams respectively and the information record surface, the objective lens on the basis of a control signal; receiving a plurality of reflection lights of the plurality of light beams reflected from the information record surface respectively, associated with a change of the relative distance; generating a plurality of focus error signals on the basis of the plurality of received reflection lights respectively; judging a type of the optical record medium by comparing peak values of the generated focus error signals respectively with a predetermined standard level; setting the focus servo gain and the focus servo frequency band on the basis of the peak values; and generating the control signal, wherein the focus servo gain and the focus servo frequency band are set in the setting step by repeating following operations with respect to the linear velocities of the optical record mediums one after another: firstly, the control signal to move the objective lens at a moving speed corresponding to a fastest linear velocity among the linear velocities is generated by the control signal generating step; the focus servo gain and the focus servo frequency band are set on the basis of a peak value of a focus error signal generated by moving the objective lens at the moving speed corresponding to the fastest linear velocity by the setting step, if the judged type of the optical record medium is one recorded with the record information at the fastest linear velocity; secondly, if the judged type of the optical record medium is not one recorded with the record information at the fastest linear velocity, the control signal to move the objective lens at a moving speed corresponding to a second fastest linear velocity among the linear velocities is generated by the control signal generating step; and the focus servo gain and the focus servo frequency band are set on the basis of a peak value of a focus error signal generated by moving the objective lens at the moving speed corresponding to the second fastest linear velocity by the setting step, if the judged type of the optical record medium is one recorded with the record information at the second fastest linear velocity.

According to the focus servo controlling method of the present invention, the information record surface is irradiated with a plurality of light beams to be focused on different positions on one optical axis. Then, the objective lens is moved on the basis of the control signal generated by the control signal generating step, so that the relative distance parallel to the optical axis between the objective lens and the information record surface is changed. Then, a plurality of reflection lights of the plurality of light beams reflected from the information record surface respectively are received in association with the change of the relative distance. Then, a plurality of focus error signals are generated on the basis of the plurality of received reflection lights respectively. Then, the type of the optical record medium is judged by comparing peak values of the generated focus error signals respectively with a predetermined standard level. Then, the focus servo gain and the focus servo frequency band are set on the basis of the peak values. At this time, the focus servo gain and the focus servo frequency band are set in the setting step by repeating following operations with respect to the linear velocities of the optical record mediums one after another. That is to say, firstly, the control signal to move the objective lens at the moving speed corresponding to the fastest linear velocity is generated. Then, if the judged type of the optical record medium is one recorded with the record information at the fastest linear velocity, the focus servo gain and the focus servo frequency band are set on the basis of the peak value of the focus error signal generated while the objective lens is moved at the moving speed corresponding to the fastest linear velocity. Secondly, if the judged type of the optical record medium is not one recorded with the record information at the fastest linear velocity, the control signal to move the objective lens at the moving speed corresponding to the second fastest linear velocity is generated. Then, if the judged type of the optical record medium is one recorded with the record information at the second fastest linear velocity, the focus servo gain and the focus servo frequency band are set on the basis of the peak value of the focus error signal generated while the objective lens is moved at the moving speed corresponding to the second fastest linear velocity. Then, until the optical record medium is appropriately judged and the focus servo gain and the focus servo frequency band are appropriately set, these operations are repeated.

Accordingly, the setting operations of the focus servo gain and the focus servo frequency band can be performed efficiently within a relatively short time period. Further, the judging operation of the optical record medium and the setting operations of the focus servo gain and the focus servo frequency band can be performed in one consecutive procedure. Therefore, it is possible to speedily perform the rising operation of the compatible reproducing apparatus, which can reproduce the optical record mediums of different types even if the diameters thereof are same to each other as in the case of the CD and the DVD. Namely, as long as the linear velocities of recording the information are different from each other, the rising operation can be speedily performed according to the focus servo controlling method of the present invention.

As one aspect of the focus servo controlling method of the present invention, the optical record mediums include a first optical record medium, on which the record information is recorded at a first linear velocity, and a second optical record medium, on which the record information is recorded at a second linear velocity lower than the first linear velocity and which distance from the external surface thereof to the information record surface thereof is different from that of the first optical record medium. The moving step is provided with the step of firstly moving the objective lens at a first moving speed corresponding to the first linear velocity. The receiving step is provided with the step of firstly receiving the plurality of reflection lights associated with the change of the relative distance in the firstly moving step. The focus error generating step is provided with the step of firstly generating the plurality of focus error signals on the basis of the reflection lights received by the firstly receiving step. The method is further provided with the step of firstly calculating the peak values of the focus error signals respectively generated by the firstly generating step. The judging step is provided with the steps of judging the optical record medium as the first optical record medium if at least one of the peak values calculated by the firstly calculating step is equal to or higher than the predetermined standard level, and judging the optical record medium as the second optical record medium if all of the peak values calculated by the firstly calculating step are lower than the predetermined standard level. The setting step is provided with the step of firstly setting the focus servo gain and the focus servo frequency band on the basis of a highest peak value of the peak values calculated by the firstly calculating step, if the optical record medium is judged as the first optical record medium. The moving step is further provided with the step of secondly moving the objective lens at a second moving speed, which corresponds to the second linear velocity and which is lower than the first moving speed, if the optical record medium is judged as the second optical record medium. The receiving step is further provided with the step of secondly receiving the plurality of reflection lights associated with the change of the relative distance in the secondly moving step. The focus error generating step is further provided with the step of secondly generating the plurality of focus error signals on the basis of the reflection lights received by the secondly receiving step. The focus error controlling method is further provided with the step of secondly calculating the peak values of the focus error signals respectively generated by the secondly generating step. The setting step is provided with the step of secondly setting the focus servo gain and the focus servo frequency band on the basis of a highest peak value of the peak values calculated by the secondly calculating step.

According to this aspect of the present invention, the objective lens is firstly moved at the first moving speed corresponding to the first linear velocity. Then, the plurality of reflection lights associated with the change of the relative distance in the firstly moving step are firstly received. Then, the plurality of focus error signals are firstly generated on the basis of the reflection lights received by the firstly receiving step. Then, the peak values of the focus error signals respectively generated by the firstly generating step are firstly calculated. Then, the optical record medium is judged as the first optical record medium if at least one of the peak values calculated by the firstly calculating step is equal to or higher than the predetermined standard level. On the other hand, the optical record medium is judged as the second optical record medium if all of the peak values calculated by the firstly calculating step are lower than the predetermined standard level. Then, the focus servo gain and the focus servo frequency band are firstly set on the basis of the highest peak value of the peak values calculated by the firstly calculating step, if the optical record medium is judged as the first optical record medium. After that, if the optical record medium is judged as the second optical record medium, the objective lens is secondly moved at the second moving speed. Here, the second moving speed corresponds to the second linear velocity and is lower than the first moving speed. Then, the plurality of reflection lights associated with the change of the relative distance in the secondly moving step are secondly received. Then, the plurality of focus error signals are secondly generated on the basis of the reflection lights received by the secondly receiving step. Then, the peak values of the focus error signals respectively generated by the secondly generating step are secondly calculated. Finally, the focus servo gain and the focus servo frequency band are secondly set on the basis of the highest peak value of the peak values calculated by the secondly calculating step.

Accordingly, the setting operations of the focus servo gain and the focus servo frequency band can be performed efficiently within a relatively short time period. Further, the judging operation of the optical record medium and the setting operations of the focus servo gain and the focus servo frequency band can be performed in one consecutive procedure. Therefore, it is possible to speedily perform the rising operation of the compatible reproducing apparatus, which can reproduce the first and second optical record mediums even if the diameters of the first and second optical record medium are same to each other as in the case of the CD and the DVD. Namely, as long as the distances between the external surfaces to the information record surfaces are different between the first and second optical record medium, the rising operation can be speedily performed according to this aspect of the present invention.

In this aspect of the present invention, in the irradiating step, the first light beam may be a 0 order light generated by a bifocal lens, and the second light beam may be a +1 order light generated by the bifocal lens. Thus, it is possible to irradiate the information record surface with a plurality of light beams by employing a relatively simple construction i. e., the bifocal lens, to the optical system while the focus servo control operation including the focus search action can be efficiently and reliably performed.

The above object of the present invention can be also achieved by an optical record medium judging apparatus for judging types of optical record mediums, which distances from external surfaces thereof to information record surfaces thereof recorded with record information are different from each other. The optical record medium judging apparatus is provided with: a light irradiating device for irradiating an information record surface of an optical record medium to be reproduced with a plurality of light beams to be focused on different positions on one optical axis; a lens moving device for moving, so as to change a relative distance parallel to said one optical axis between an objective lens for prescribing focal points of the plurality of light beams respectively and the information record surface, the objective lens; a light receiving device for receiving a plurality of reflection lights of the plurality of light beams reflected from the information record surface respectively, associated with a change of the relative distance; a focus error generating device for generating a plurality of focus error signals on the basis of the plurality of received reflection lights respectively; and a judging device for judging a type of the optical record medium by comparing levels of the generated focus error signals respectively with a predetermined standard level.

As one aspect of the optical record medium judging apparatus of the present invention, the optical record mediums include first and second optical record mediums which distances from the external surfaces thereof to the information record surfaces thereof are different from each other. The light irradiating device is provided with a device for irradiating the information record surface with a first light beam to reproduce the record information from the first optical record medium, and irradiating the information record surface with a second light beam to reproduce the record information from the second optical record medium, the second light beam having a focal point farther from the objective lens than the first light beam. The light receiving device is provided with a first receiving device for receiving a first reflection light of the first light beam reflected from the information record surface, and a second receiving device for receiving a second reflection light of the second light beam reflected from the information record surface. The focus error signal generating device is provided with a first generating device for generating a first focus error signal on the basis of the received first reflection light, and a second generating device for generating a second focus error signal on the basis of the received second reflection light. The type judging device is provided with a first judging device for judging the type of the optical record medium as the first optical record medium if at least one of the levels of the first and second focus error signals is equal to or higher than the predetermined standard level, and a second judging device for judging the type as the second optical record medium if both of the levels are lower than the predetermined standard level.

In this aspect of the present invention, in the light irradiating device, the first light beam may be a 0 order light generated by a bifocal lens, and the second light beam may be a +1 order light generated by the bifocal lens.

According to the optical record medium judging apparatus of the present invention, the aforementioned optical record medium judging method of the present invention can be certainly performed, and the same advantageous effects as those of the optical record medium judging method can be achieved by the optical record medium judging apparatus according to the present invention.

The above object of the present invention can be also achieved by a focus servo controlling apparatus for judging types of optical record mediums, on which record informations are recorded at linear velocities different from each other, and setting a focus servo gain and a focus servo frequency band corresponding to each of the types of the optical record mediums. The focus servo controlling apparatus is provided with: a light irradiating device for irradiating an information record surface recorded with record information of an optical record medium to be reproduced with a plurality of light beams to be focused on different positions on one optical axis; a lens moving device for moving, so as to change a relative distance parallel to said one optical axis between an objective lens for prescribing focal points of the plurality of light beams respectively and the information record surface, the objective lens on the basis of a control signal; a light receiving device for receiving a plurality of reflection lights of the plurality of light beams reflected from the information record surface respectively, associated with a change of the relative distance; a focus error generating device for generating a plurality of focus error signals on the basis of the plurality of received reflection lights respectively; a type judging device for judging a type of the optical record medium by comparing peak values of the generated focus error signals respectively with a predetermined standard level; a servo setting device for setting the focus servo gain and the focus servo frequency band on the basis of the peak values; and a control signal generating device for generating the control signal, wherein the servo setting device sets the focus servo gain and the focus servo frequency band by repeating following operations with respect to the linear velocities of the optical record mediums one after another: firstly, the control signal generating device generates the control signal to move the objective lens at a moving speed corresponding to a fastest linear velocity among the linear velocities; the servo setting device sets the focus servo gain and the focus servo frequency band on the basis of a peak value of a focus error signal generated by moving the objective lens at the moving speed corresponding to the fastest linear velocity, if the judged type of the optical record medium is one recorded with the record information at the fastest linear velocity; secondly, if the judged type of the optical record medium is not one recorded with the record information at the fastest linear velocity, the control signal generating device generates the control signal to move the objective lens at a moving speed corresponding to a second fastest linear velocity among the linear velocities; and the servo setting device sets the focus servo gain and the focus servo frequency band on the basis of a peak value of a focus error signal generated by moving the objective lens at the moving speed corresponding to the second fastest linear velocity, if the judged type of the optical record medium is one recorded with the record information at the second fastest linear velocity.

As one aspect of the focus servo controlling apparatus of the present invention, the optical record mediums include a first optical record medium, on which the record information is recorded at a first linear velocity, and a second optical record medium, on which the record information is recorded at a second linear velocity lower than the first linear velocity and which distance from the external surface thereof to the information record surface thereof is different from that of the first optical record medium. The lens moving device is provided with a first moving device for firstly moving the objective lens at a first moving speed corresponding to the first linear velocity. The light receiving device is provided with a first receiving device for firstly receiving the plurality of reflection lights associated with the change of the relative distance of the objective lens moved by the first moving device. The focus error generating device is provided with a first generating device for firstly generating the plurality of focus error signals on the basis of the reflection lights received by the first receiving device. The apparatus is further provided with a first calculating device for firstly calculating the peak values of the focus error signals respectively generated by the first generating device. The type judging device is provided with a first judging device for judging the optical record medium as the first optical record medium if at least one of the peak values calculated by the first calculating device is equal to or higher than the predetermined standard level, and a second judging device for judging the optical record medium as the second optical record medium if all of the peak values calculated by the first calculating device are lower than the predetermined standard level. The servo setting device is provided with a first setting device for firstly setting the focus servo gain and the focus servo frequency band on the basis of a highest peak value of the peak values calculated by the first calculating device, if the optical record medium is judged as the first optical record medium. The lens moving device is further provided with a second moving device for secondly moving the objective lens at a second moving speed, which corresponds to the second linear velocity and which is lower than the first moving speed, if the optical record medium is judged as the second optical record medium. The light receiving device is further provided with a second receiving device for secondly receiving the plurality of reflection lights associated with the change of the relative distance of the objective lens moved by the second moving device. The focus error generating device is further provided with a second generating device for secondly generating the plurality of focus error signals on the basis of the reflection lights received by the second receiving device. The focus servo controlling apparatus is further provided with a second calculating device for secondly calculating the peak values of the focus error signals respectively generated by the second generating device; and the servo setting device is provided with a second setting device for secondly setting the focus servo gain and the focus servo frequency band on the basis of a highest peak value of the peak values calculated by the second calculating device.

In this aspect of the present invention, in the light irradiating device, the first light beam may be a 0 order light generated by a bifocal lens, and the second light beam may be a +1 order light generated by the bifocal lens.

According to the focus servo controlling apparatus of the present invention, the aforementioned focus servo controlling method of the present invention can be certainly performed, and the same advantageous effects as those of the focus servo controlling method can be achieved by the focus servo controlling apparatus according to the present invention.

In this manner, according to the above described optical record medium judging method and apparatus of the present invention, it is possible to judge the CD and the DVD in the CD/DVD compatible reproducing apparatus having the bifocal lens. Further, according to the above described focus servo controlling method and apparatus of the present invention, it is possible to rapidly set the focus servo gain and the focus servo frequency band in parallel to the above mentioned judging action. Consequently, it is possible to carry out the rapid rising operation in the CD/DVD compatible reproducing apparatus.

The nature, utility, and further features of this invention will be more clearly apparent from the following detailed description with respect to preferred embodiments of the invention when read in conjunction with the accompanying drawings briefly described below.

DESCRIPTION OF THE PREFERRED EMBODIMENT

Next, a preferred embodiment of the present invention will be explained with reference to the drawings.

(I) PRINCIPLE OF OPTICAL DISK JUDGMENT

Figure 1A:
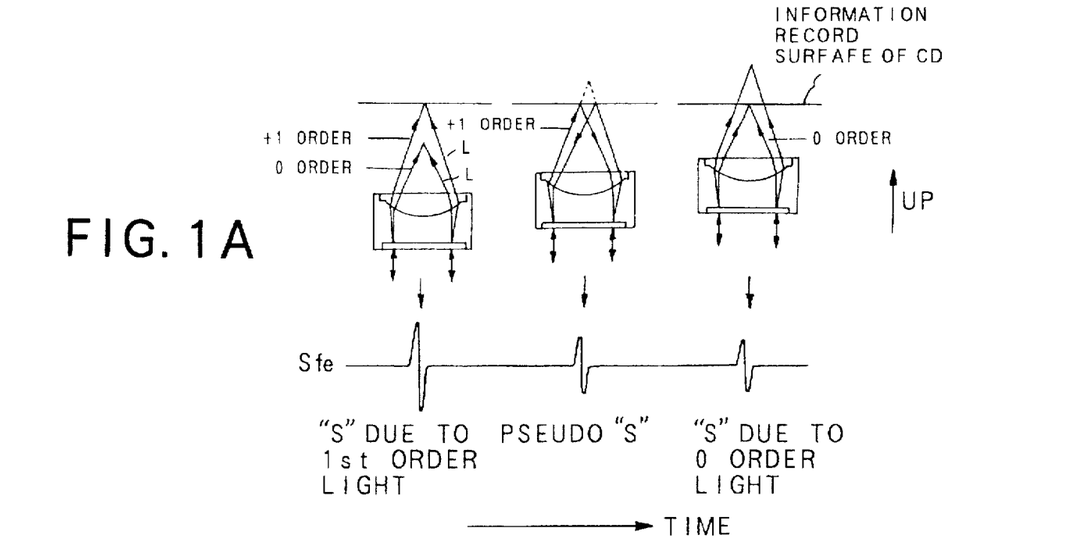
FIG. 1A is a diagram showing a principle of an optical disk judgment and showing a focus error signal generated in conjunction with the moving up action of a bifocal lens.

Before explaining a construction and operation of an embodiment, the principle of the optical disk judgment in this embodiment is explained with reference to FIGS. 1A and 1B.

As mentioned above, the two light beams L from an optical pickup having a bifocal lens are set such that the +1 order light is optimally beam-condensed on the CD and the 0 order light is optimally beam-condensed on the DVD, and the +1 order light is longer in focal length than the 0 order light. Thus, for example, as shown in FIG. 1A, when the bifocal lens is moved up for the CD, at first the +1 order light is beam-condensed on an information record surface of the CD and then a focus error signal Sfe is detected. Next, a pseudo signal of the focus error signal Sfe induced by a fact that a reflection light from the optical disk of the +1 order light is passed through an optical path of the 0 order light is detected. Finally, a focus error signal Sfe corresponding to the 0 order light is detected. Here, as mentioned above, an optical system is set such that the 0 order light is optimally beam-condensed for the DVD and the +1 order light is optimally beam-condensed for the CD. Thus, for a converse combination thereof, the optimal beam-condensing condition is not kept, for example, because of generation of spherical aberration. Therefore, in a case that the optical disk is the CD, the focus error signal Sfe corresponding to the +1 order light has the highest level, and the focus error signal Sfe corresponding to the 0 order light has the lowest level. In contrast with this, in a case that the optical disk is the DVD, the focus error signal Sfe corresponding to the 0 order light has the highest level, and the focus error signal Sfe corresponding to the +1 order light has the lowest level.

Figure 1B:
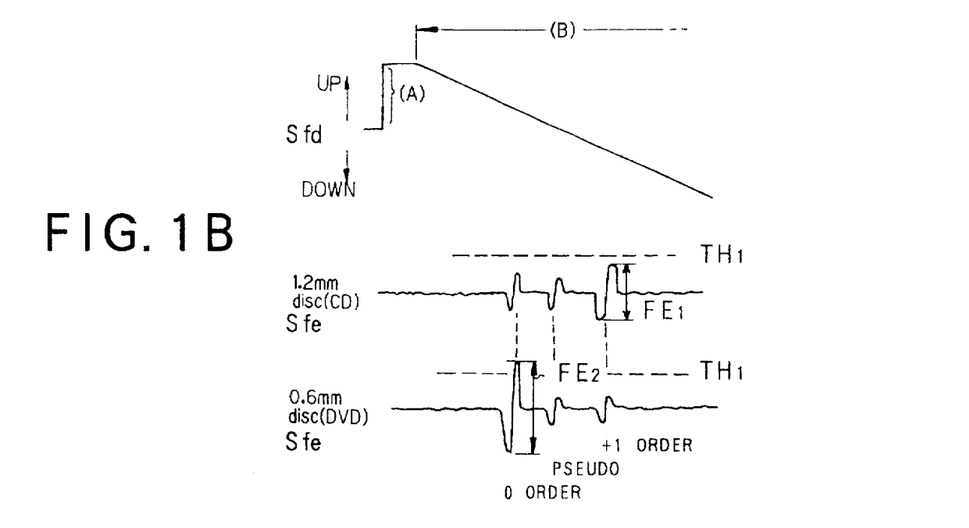
FIG. 1B is a diagram showing the focus error signals in cases of the DVD and the CD respectively.

When comparing a level of the focus error signal Sfe corresponding to the 0 order light in a case that the optical disk is the DVD with a level of the focus error signal corresponding to the +1 order light in a case that the optical disk is the CD, since a spectral ratio of a diffraction grating H of the bifocal lens is set such that a light quantity of the 0 order light is larger than that of the +1 order light in the light beam L, the level (a symbol FE2 of FIG. 1B) of the focus error signal Sfe corresponding to the 0 order light in the case that the optical disk is the DVD is higher than the level (a symbol FE1 of FIG. 1B) of the focus error signal Sfe corresponding to the +1 order light in the case that the optical disk is the CD as shown in FIG. 1B.

Therefore, a predetermined threshold TH1 is defined as a value between the level of the focus error signal Sfe corresponding to the 0 order light in the case that the optical disk is the DVD and the level of the focus error signal Sfe corresponding to the +1 order light in the case that the optical disk is the CD. Then, if one of the levels of the detected focus error signals Sfe is higher than the threshold TH1, the optical disk to which at that time the light beam L is irradiated can be judged as the DVD. If all the levels are lower than the threshold TH1, the optical disk to which at that time the light beam L is irradiated can be judged as the CD.

More actually explaining with reference to FIG. 1B, when the bifocal lens is moved up in a short time (refer to a symbol (A) of FIG. 1B) and then moved down (refer to a symbol (B) of FIG. 1B), at first the 0 order light is beam-condensed on the information record surface, and then the +1 order light is beam-condensed. Thus, if the optical disk is the CD, a level of a third focus error signal Sfe (focus error signal Sfe corresponding to the +1 order light) among three focus error signals Sfe detected in a moving down process is higher than the other two focus error signals Sfe. However, it is lower than the threshold TH1 even in this case. And, if the optical disk is the DVD, a level of a first focus error signal Sfe (focus error signal Sfe corresponding to the 0 order light) among the three focus error signals Sfe detected in the moving down process is higher than the other two focus error signals Sfe. And that, it is higher than the threshold TH1 in this case. Therefore, when the level of one of the focus error signals Sfe detected in the moving down process of the bifocal lens exceeds the threshold TH1, the optical disk is judged as the DVD. When the levels of all the focus error signals Sfe do not exceed the threshold TH1, the optical disk is judged as the CD.

(II) CONSTRUCTION AND OPERATION

Figure 2:
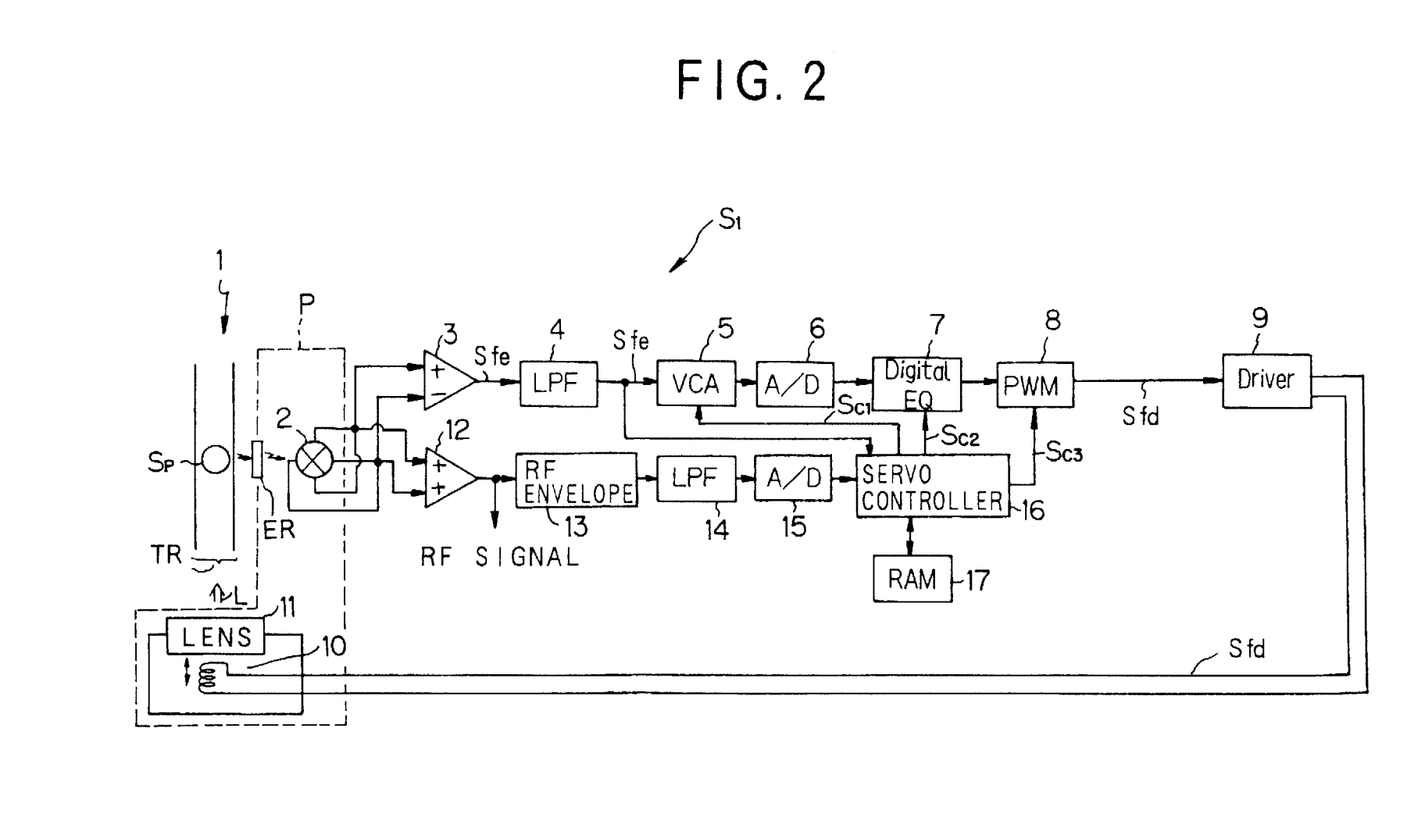
FIG. 2 is a block diagram showing a configuration of a reproducing apparatus of an embodiment.
Figure 3:
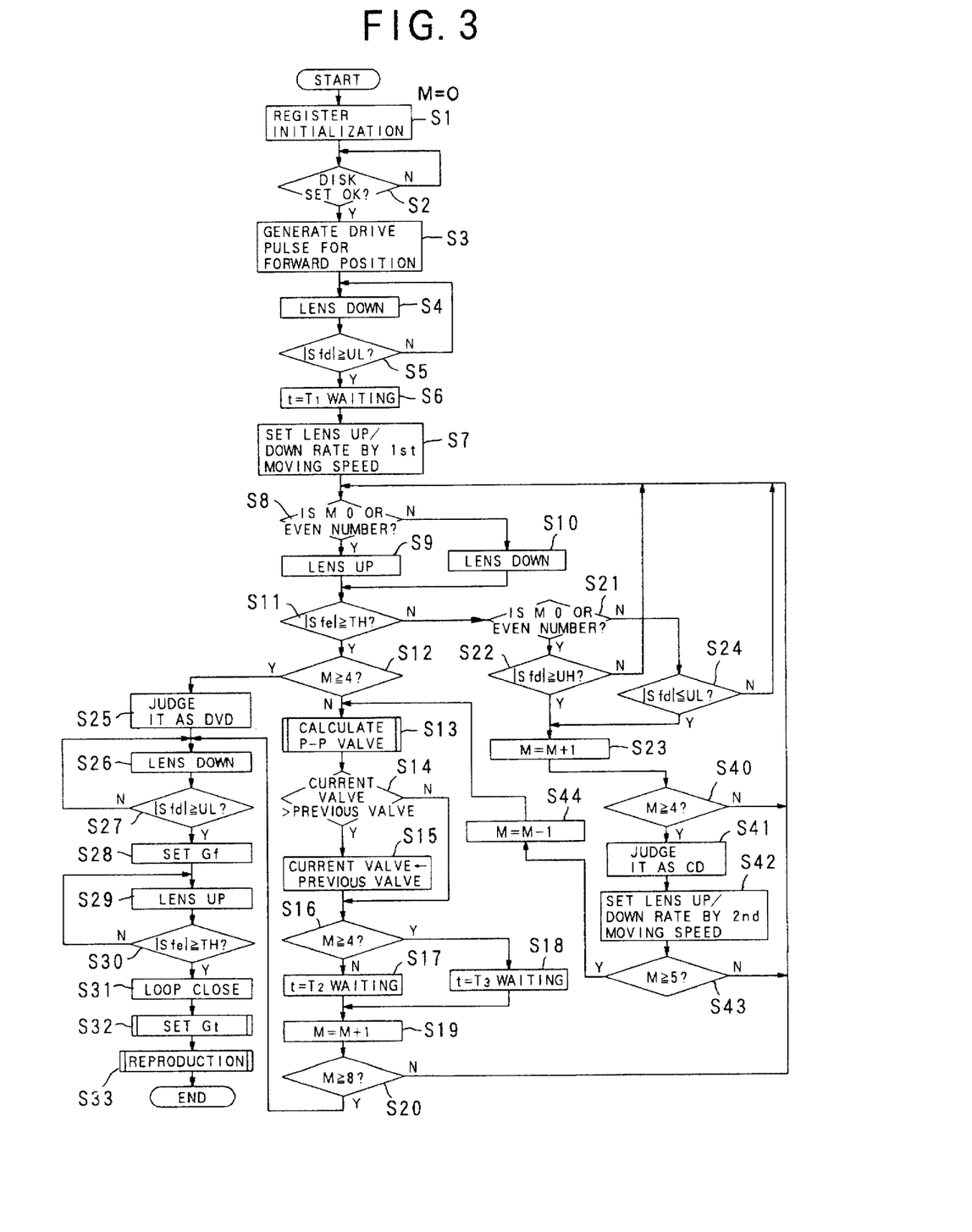
FIG. 3 is a flow chart showing an operation of the reproducing apparatus of the embodiment.
Figure 4:
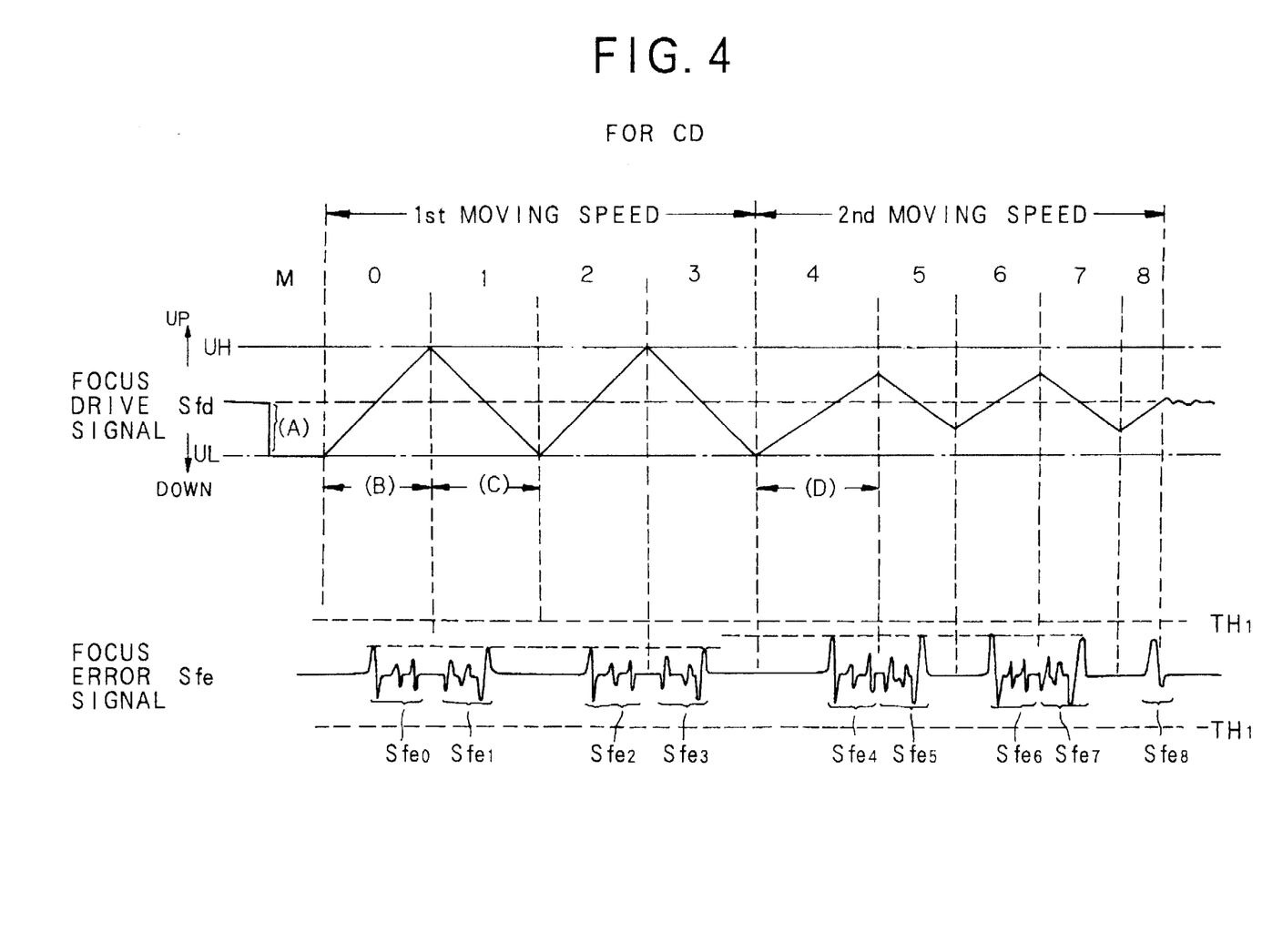
FIG. 4 is a timing chart (in a case of the CD) showing an operation of the reproducing apparatus of the embodiment.
Figure 5:
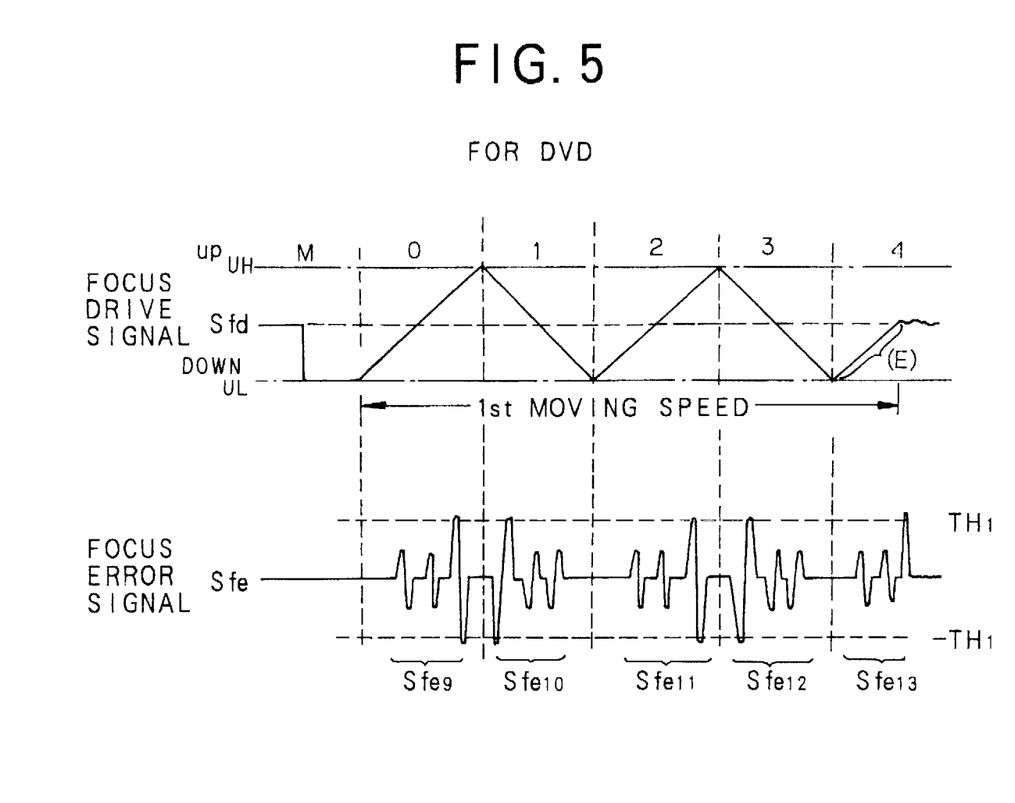
FIG. 5 is a timing chart (in a case of the DVD) showing an operation of the reproducing apparatus of the embodiment.

The construction and operation of the embodiment of the present invention based on the above mentioned principle of the optical disk is explained with reference to FIGS. 2 to 5. FIG. 2 is a schematic block diagram of a DVD/CD compatible reproducing apparatus in accordance with the present invention. FIG. 3 is the flow chart showing the operation of the DVD/CD compatible reproducing apparatus shown in FIG. 2. FIGS. 4 and 5 are the timing charts showing the operations of the DVD/CD compatible reproducing apparatus shown in FIG. 2. Incidentally, the timing chart in FIG. 4 shows the operation in a case that the CD is mounted in the DVD/CD compatible reproducing apparatus. The timing chart in FIG. 5 shows the operation in a case that the DVD is mounted.

The case in which the CD is reproduced as the optical disk is firstly explained in the following embodiment.

At first, the configuration of the DVD/CD compatible reproducing apparatus in accordance with the present invention is explained with reference to FIG. 2.

In a DVD/CD compatible reproducing apparatus $S_1$ shown in FIG. 2, in an optical disk 1 that is the CD, information is recorded on an information track TR by a phase pit or a magnetic record mark. A light spot Sp is formed by the light beam L from a laser diode (not shown) included in an optical pickup P. In FIG. 2, as an optical system installed within the optical pickup P, only devices related especially with the present invention are described, and general devices, such as a mirror, a deflecting plate and the like, are omitted.

A light-receiving device 2 is included within the optical pickup P, and is a four-divided photo detector. This light-receiving device 2 receives a reflection light which is reflected from the light spot Sp and to which astigmatism is given by a cylindrical lens ER, and outputs a detection signal.

A subtracter 3 mutually subtracts signals, in which two detectors opposite to each other in the light-receiving device 2 are synthesized respectively, and outputs the focus error signal Sfe.

A LPF (Low Pass Filter) 4 removes an unnecessary frequency component equal to or more than a sampling frequency of an A/D converter 6 described later from the focus error signal Sfe, and converts into a wave form that can be used as the focus error signal Sfe.

A VCA (Voltage Controlled Amplifier) circuit 5 sets a focus servo gain on the basis of a control signal Sc1 described later.

The A/D converter 6 converts the focus error signal Sfe amplified on the basis of the set focus servo gain into a digital signal.

A digital equalizer circuit 7 is composed of a digital filter and the like, and sets, on the basis of a control signal Sc2 described later, a focus servo frequency band corresponding to the focus error signal Sfe converted into the digital signal.

A PWM (Pulse Width Modulation) circuit 8 generates, on the basis of a control signal Sc3 described later, generates a focus drive signal Sfd having a pulse width corresponding to a level of the inputted focus error signal Sfe. At this time, on the basis of the control signal Sc3, the focus drive signal Sfd is generated so as to drive a bifocal lens 11 as an objective lens as described later at the moving speed for an operation described later.

A driver circuit 9 amplifies the focus drive signal Sfd and outputs it to an actuator 10 described later.

The actuator 10 is composed of an electromagnet coil and the like, and drives the bifocal lens 11 into an optical axis direction (focus direction) of the light beam L, on the basis of the focus drive signal Sfd.

An adder 12 adds all the detection signals outputted from the light-receiving device 2 to thereby generate a read RF (Radio Frequency) signal. This read RF signal is outputted to an demodulator (not shown) and the like as a reproduction signal including record information, and also outputted to an RF envelope circuit 13.

The RF envelope circuit 13 is composed of a low pass filter and the like, and outputs an amplitude amount (envelope) of the read RF signal, from which a high frequency signal due to a pit is removed among the RF signal.

The LPF 14 extracts only a low band frequency component from the envelope.

An A/D converter 15 converts the envelope into a digital signal and outputs it to a servo controller 16.

The servo controller 16 calculates, on the basis of the focus error signal Sfe, a peak value thereof, and also, on the basis of the maximum peak value of the peak values, outputs the control signal Sc1 to set the focus servo gain, the control signal Sc2 to set the focus servo frequency band and the control signal Sc3 to control the moving speed of the bifocal lens 11. In addition to these functions, the servo controller 16 controls the whole focus servo action in the DVD/CD compatible reproducing apparatus $S_1$. Information required for these operations of the servo controller 16 is transiently stored in a RAM (Random Access Memory) 17.

Next, rising operations including a judging action of the optical disk 1 and the focus servo gain and focus servo frequency band setting action in the DVD/CD compatible reproducing apparatus $S_1$ are explained with reference to FIGS. 3 to 5.

The rising operations shown in FIGS. 3 to 5 are mainly carried out under the control of the servo controller 16. At first, under a first moving speed corresponding to the linear velocity of the record information recorded in the DVD, the bifocal lens 11 is, for example, driven to reciprocate twice (respective two times in moving up and moving down actions) in the optical axis direction of the light beam L. The disk is judged by a method shown in FIGS. 1A and 1B, on the basis of the peak value of the focus error signal Sfe detected at that time. If it is judged as the DVD, the focus servo gain and the focus servo frequency band are set by using the maximum value of the detected peak value. On the other hand, in a case that it is judged as the CD, at a second moving speed (slower than the first moving speed) corresponding to the linear velocity of the record information recorded in the CD, the bifocal lens 11 is, for example, further driven to reciprocate twice (respective two times in the moving up and moving down actions) in the optical axis direction of the light beam L. The focus servo gain and the focus servo frequency band are set on the basis of the maximum peak value of the focus error signals Sfe detected at that time. In FIGS. 4 and 5, a "+" side of the focus drive signal Sfd corresponds to the moving up action (a direction approaching the optical disk 1) of the bifocal lens 11, and a "−" side corresponds to the moving down action (a direction going away from the optical disk 1) of the bifocal lens 11. Further, in FIGS. 3 to 5, "UH" is a focus drive signal Sfd corresponding to an upper limit position of the bifocal lens 11. "UL" is a focus drive signal Sfd corresponding to a lower limit position of the bifocal lens 11.

The followings are explained, assuming that the CD is mounted in the DVD/CD compatible reproducing apparatus $S_1$.

As shown in FIG. 3, at first a register and the like included in the servo controller 16 are initialized (Step S1), in the rising operations in the DVD/CD compatible reproducing apparatus $S_1$ in which the CD is mounted. In the step S1 in FIG. 3, a reference numeral M denotes the number of the moving up and moving down movements of the bifocal lens 11. Actually, as shown in FIG. 4 or 5, a first moving up process corresponds to M="0", and a next moving down process corresponds to M="1".

When the initialization (Step 1) is ended, whether or not the optical disk 1 is mounted in the reproducing apparatus $S_1$ is detected by a detecting device (not shown in FIG. 2) (Step S2). In a case that it is not mounted (Step S2; NO), the operation is waited as it is. In a case that the optical disk 1 is mounted (Step S2; YES), the optical disk 1 is rotated by a spindle motor (not shown in FIG. 2) (Step S3).

When the optical disk is started to be rotated (Step S3), the focus drive signal Sfd is outputted, on the basis of the control signal Sc3, so as to move down the bifocal lens 11 in a short time (Step S4, and refer to a symbol (A) of FIG. 4). Then, it is judged whether or not the bifocal lens 11 moves down to a lower limit position (Step S5). Namely, it is checked whether or not | Sfd | ≧ UL. When the bifocal lens 11 is moved down to a lower limit position (Step S5; YES), the operation is waited for a time period T1 corresponding to a preparing period (for example, a necessary period until a movement of the lens becomes stable) to detect the focus error signal Sfe (Step S6). After that, it is set such that the bifocal lens 11 is moved up at the first moving speed corresponding to the linear velocity of the DVD (Step S7). Next, it is judged whether the value of M is "0" or an even value (Step S8). Since the value of M is "0" at this state (Step S8; YES), the focus drive signal Sfd is outputted in order to start to move up the bifocal lens 11 located at the lower limit position at the first moving speed (Step S9, and refer to a symbol (B) of FIG. 4). Then, it is judged whether or not any one of the peak values exceeds the threshold TH1 (refer to a symbol TH1 of FIG. 1), for a focus error signal Sfe0 (refer to FIG. 4) detected at the moving up process (Step S11). Since the optical disk 1 is the CD in this embodiment, the peak value of the focus error signal Sfe0 does not exceed the threshold TH1 as explained in FIG. 1 (Step S11; NO). Next, it is judged whether the value of M is "0" or the even value (Step S21). Since the value of M is "0" presently (Step S21; YES), it is judged whether or not the bifocal lens 11 is located at an upper limit position (Step S22). Namely, it is checked whether or not | Sfd | ≧ UH. In a case that it is not located at the upper limit position (Step S22; NO), the operation is returned to the step S8 in order to continue the moving up action as it is. In a case of the upper limit position (Step S22; YES), M is increased (incremented) by "1" and set to "1" in this case (Step S23). It is judged whether or not the value of M is equal to or more than "4" (Step S40). Since it is not "4" presently (Step S40; NO), the operation is returned to the step S8.

Since the value of M is "1" at the step S8 (Step S8; NO), at this time the focus drive signal Sfd is outputted in order to move down the bifocal lens 11 (Step S10, and refer to a symbol (C) of FIG. 4). It is judged whether or not the peak value exceeds the threshold TH1 (refer to the symbol TH1 of FIG. 1), for a focus error signal Sfe1 (refer to FIG. 4) detected at the moving down process (Step S11). Since the optical disk 1 is presently assumed to be the CD, the peak value of the focus error signal Sfe1 does not exceed the threshold TH1 similarly to the above mentioned case (Step S11; NO). Next, it is judged whether the value of M is "0" or the even value (Step S21). Since the value of M is "1" presently (Step S21; NO), it is judged whether or not the bifocal lens 11 is located at the lower limit position (Step S24). In a case that it is not located at the lower limit position (Step S24; NO), the operation is returned to the step S8 in order to continue the moving down action as it is. In a case of the lower limit position (Step S24; YES), M is increased by "1" and set to "2" in this case (Step S23). It is judged whether or not the value of M is equal to or more than "4" (Step S40). Since it is not "4" presently (Step S40; NO), the operation is returned to the step S8.

The above mentioned action is continued until the value of M becomes "3", and the bifocal lens 11 is reciprocated two times at the first moving speed. At this time, the focus error signals Sfe0 to Sfe3 (refer to FIG. 4) do not exceed the threshold TH1, since the optical disk 1 is the CD. Thus, the judgment result is always "NO" at the step S11.

When the value of M becomes "3" and the bifocal lens 11 is moved down (Step S10), then the value of M is increased by "1" at the step S23 through the steps S11, S21 and S22, and set to "4" in this case. The judgment result becomes "YES" at the step S40. Thus, since the peak value of the focus error signals Sfe detected until that time does not exceed the threshold TH1 (refer to FIG. 4), the optical disk 1 is judged as the CD (Step S41). It is set such so as to carry out a later moving action of the bifocal lens 11 at the second moving speed corresponding to the linear velocity of the record information recorded in the CD (slower than that of the DVD) (Step S42). It is judged whether or not the value of M is equal to or more than "5" (Step S43). Since it is "4" presently (Step S43; NO), the operation is returned to the step S8. Since the value of M is "4" (Step S8; YES), the focus drive signal Sfd is outputted in order to move up the bifocal lens 11 located at the lower limit position at the second moving speed (Step S9, and refer to a symbol (D) of FIG. 4). A focus error signal Sfe4 detected at this moving up process does not exceed the threshold TH1, since the optical disk 1 is the CD (Step S11; NO). It is judged whether the value of M is "0" or the even value (Step S21). Since it is "4" presently (Step S23; YES), it is judged whether or not the bifocal lens 11 is located at the upper limit position (Step S22). In a case that it is not the upper limit position (Step S22; NO), the operation is returned to the step S8 so as to continue the moving up action as it is. In a case of the upper limit position (Step S22; YES), M is increased by 1 and set to "5" in this case (Step S23). It is judged whether or not the value of M is equal to or more than "4" (Step S40). Since the value of M is "5" presently (Step S40; YES), it is judged whether or not the value of M is equal to or more than "5" through the steps S41 and S42 (Step S43). Since it is "5" presently (Step S43; YES), the value of M is decreased (decremented) by "1" and set to "4" in this case (Step S44). Then, the peak value of the focus error signals Sfe4 is calculated in the servo controller 16 on the basis of the focus error signal Sfe4 (Step S13). Then, the peak value at the previous time is compared with the peak value at the current time (Step S14). In a case that the previous value is larger (Step S14; NO), the operation is shifted to the step S16. In a case that the current value is larger (Step S14; YES), the current value is stored (Step S15), and the operation is shifted to the step S16. It is judged whether or not the value of M is equal to or more than "4" (Step S16). Since it is "4" presently (Step S16; YES), the operation is waited for a waiting time period T3 corresponding to the case of the CD so as to shift to a process after the peak value is calculated (Step S18). The value of M is increased by "1" and set to "5" in this case (Step S19). It is judged whether or not the value of M is equal to or more than "8" (Step S20). Since it is "5" presently (Step S20; NO), the operation is returned to the step S8. It is judged whether or not the value of M is "0" or the even value (Step S8).

Since the value of M is "5" presently at the step S8 (Step S8; NO), the operation is shifted to the step S10 in order to move down the bifocal lens 11. Then, the bifocal lens 11 is moved down (Step S10). Similarly, the operations at the step S11 and the steps S21 to S24, and the steps S40 to S44, and the steps S13 to S16, and the step S18 are carried out. The value of M is increased by "1" and set to "6" in this case (Step S19). The judgment result becomes "NO" at the step S20, and becomes "YES" at the step S8. Then, the operation is shifted to the step S9 in order to move up the bifocal lens 11. The above mentioned actions are repeated until the value of M becomes "8". The bifocal lens 11 is reciprocated two times at the second moving speed. Since all the peak values of the detected focus error signals Sfe4 to Sfe8 even in this case are equal to or less than the threshold TH1 (refer to FIG. 4), the operation is always turned to the "NO" direction at the step S11.

When the value of M becomes "8" (Step S20; YES), the bifocal lens 11 is once moved down to the lower limit position (Steps S26 and S27). A focus servo gain Gf is set (Step S28) by using the maximum value of the peak values stored (Step S15) until that time. After that, again the bifocal lens 11 is moved up to the upper limit position (Steps S29 and S30). The focus servo loop is closed (Step S31) by using a focus error signal Sfe8 detected at that time (refer to FIG. 4). Further for example, a tracking servo gain Gt is set (Step S32) by reading the peak value of the tracking error signal obtained on the basis of a three-beam method, a DPP (Differential Push-Pull) method and the like (Step S32), and then the reproduction of the record information is started (Step S33). The rising operation in a case that the optical disk 1 is the CD is ended as mentioned above. The timing chart of FIG. 4 shows the wave form of the focus error signal Sfe and focus drive signal Sfd at this time.

On the other hand, in a case that the optical disk 1 is the DVD, any one of focus error signals Sfe9 to Sfe12 detected while the value of M is ranging from "0" to "3" exceeds the threshold TH1, as shown in FIG. 5 (Step S11; YES). In this case, it is judged whether or not the value of M is equal to or more than "4" at the step S12. Since it is equal to or less than "3" presently (Step S12; NO), then the actions at the steps S13 to S20 are carried out. Incidentally, at the step 17, the operation is waited for a waiting period T2 corresponding to the case of the DVD for shifting to a process after the peak value is calculated. While the value of M is ranging from "0" to "3", the bifocal lens 11 is reciprocated two times in upward and downward directions at the first moving speed, as shown in FIG. 5.

In a case that the value of M is "3", the value of M is set to "4" at the step S19. The operation is returned to the step S9 through the processing of the steps S20 and S8, and then the focus drive signal Sfd (refer to a symbol (E) of FIG. 5) is outputted in order to move up the bifocal lens 11. The moving speed in this case is still the first moving speed. When the bifocal lens 11 is moved up (Step S9), since the optical disk 1 is the DVD, the peak value of a detected focus error signal Sfe13 exceeds the threshold TH1 (Step S11; YES, and refer to FIG. 5). Further, since the value of M is "4" in this case (Step S12; YES), the optical disk 1 is judged as the DVD (Step S25). After that, the operations similar to the case in which the optical disk 1 is the CD (the steps S26 to S33) are carried out. The rising operation in a case that the optical disk is the DVD is ended as mentioned above. The timing chart of FIG. 5 shows the wave form of the focus error signal Sfe and the focus drive signal Sfd at this time. As can be seen from FIGS. 4 and 5, in a case that the optical disk 1 is the DVD, the rising operation thereof is ended in a shorter time than that of the CD.

As explained above, according to the present invention, at first, the type of the optical disk 1 is judged on the basis of the focus error signal Sfe obtained at a time of moving the bifocal lens 11 at the first moving speed. When it is the DVD, the focus servo gain and the focus servo frequency band are set on the basis of the peak value as it is. In a case that the optical disk 1 is judged as the CD, the bifocal lens 11 is continuously moved at the second moving speed. The focus servo gain and the focus servo frequency band are set on the basis of the focus error signals Sfe4 to Sfe8 obtained in conjunction with the above mentioned movement. As a result, it is possible to carry out the setting actions of the focus servo gain and the focus servo frequency band in the effective manner and in the short time.

Also, it is possible to carry out the judgment of the optical disk 1 and the setting actions of the focus servo gain and the focus servo frequency band in a series of actions.

As a result, it is possible to shorten a time needed for the rising operation in the compatible reproducing apparatus which can reproduce both the DVD and the CD.

In this embodiment, the threshold TH1 of judging the optical disk is set as a single value. However, if setting a threshold for the DVD and a threshold for the CD which is lower than that of the DVD, it is possible to surely judge the CD and also possible to use the operational steps in common to the DVD and the CD. By setting a plurality of thresholds, it is easy for one skilled in the art to modify in such a way that the present invention is applied to judging of more than two kinds of the optical disks.

Further, after the optical disk is judged, it is allowable to change the moving upper limit UH and the moving lower limit UL of the lens. Although the example in which the focus error signal is read every four times is explained, it is not limited to this example. It is allowable to carry out at least one reading action or more. Furthermore, it is allowable to make the number of reading action different for each disk type as the occasion demands.

The invention may be embodied in other specific forms without departing from the spirit or essential characteristics thereof. The present invention embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical record medium judging method of judging types of optical record mediums, which distances from external surfaces thereof to information record surfaces thereof recorded with record information are different from each other, said method comprising the steps of:

irradiating an information record surface of an optical record medium to be reproduced with a plurality of light beams to be focused on different positions on one optical axis;

moving, so as to change a relative distance parallel to said one optical axis between an objective lens for prescribing focal points of said plurality of light beams respectively and said information record surface, said objective lens;

receiving a plurality of reflection lights of said plurality of light beams reflected from said information record surface respectively, associated with a change of said relative distance;

generating a plurality of focus error signals on the basis of said plurality of received reflection lights respectively; and judging a type of said optical record medium by comparing levels of the generated focus error signals respectively with a predetermined standard level.

2. A method according to claim 1, wherein:

said optical record mediums comprise first and second optical record mediums which distances from the external surfaces thereof to the information record surfaces thereof are different from each other;

said irradiating step comprises the steps of irradiating the information record surface with a first light beam to reproduce the record information from said first optical record medium, and irradiating the information record surface with a second light beam to reproduce the record information from said second optical record medium, said second light beam having a focal point farther from said objective lens than said first light beam;

said receiving step comprises the steps of receiving a first reflection light of said first light beam reflected from the information record surface, and receiving a second reflection light of said second light beam reflected from the information record surface;

said focus error signal generating step comprises the steps of generating a first focus error signal on the basis of the received first reflection light, and generating a second focus error signal on the basis of the received second reflection light; and said judging step comprises the steps of judging the type of said optical record medium as said first optical record medium if at least one of the levels of said first and second focus error signals is equal to or higher than the predetermined standard level, and judging the type as said second optical record medium if both of the levels are lower than the predetermined standard level.

3. A method according to claim 2, wherein, in said irradiating step, said first light beam is a 0 order light generated by a bifocal lens, and said second light beam is a +1 order light generated by said bifocal lens.

4. A focus servo controlling method of judging types of optical record mediums, on which record informations are recorded at linear velocities different from each other, and setting a focus servo gain and a focus servo frequency band corresponding to each of the types of said optical record mediums, said method comprising the steps of:

irradiating an information record surface recorded with record information of an optical record medium to be reproduced with a plurality of light beams to be focused on different positions on one optical axis;

moving, so as to change a relative distance parallel to said one optical axis between an objective lens for prescribing focal points of said plurality of light beams respectively and said information record surface, said objective lens on the basis of a control signal;

receiving a plurality of reflection lights of said plurality of light beams reflected from said information record surface respectively, associated with a change of said relative distance;

generating a plurality of focus error signals on the basis of said plurality of received reflection lights respectively;

judging a type of said optical record medium by comparing peak values of the generated focus error signals respectively with a predetermined standard level;

setting the focus servo gain and the focus servo frequency band on the basis of the peak values; and generating the control signal, wherein the focus servo gain and the focus servo frequency band are set in said setting step by repeating following operations with respect to the linear velocities of said optical record mediums one after another:

firstly, the control signal to move said objective lens at a moving speed corresponding to a fastest linear velocity among the linear velocities is generated by said control signal generating step;

the focus servo gain and the focus servo frequency band are set on the basis of a peak value of a focus error signal generated by moving said objective lens at the moving speed corresponding to the fastest linear velocity by said setting step, if the judged type of said optical record medium is one recorded with the record information at the fastest linear velocity;

secondly, if the judged type of said optical record medium is not one recorded with the record information at the fastest linear velocity, the control signal to move said objective lens at a moving speed corresponding to a second fastest linear velocity among the linear velocities is generated by said control signal generating step; and the focus servo gain and the focus servo frequency band are set on the basis of a peak value of a focus error signal generated by moving said objective lens at the moving speed corresponding to the second fastest linear velocity by said setting step, if the judged type of said optical record medium is one recorded with the record information at the second fastest linear velocity.

5. A method according to claim 4, wherein:

said optical record mediums comprise a first optical record medium, on which the record information is recorded at a first linear velocity, and a second optical record medium, on which the record information is recorded at a second linear velocity lower than the first linear velocity and which distance from the external surface thereof to the information record surface thereof is different from that of said first optical record medium;

said moving step comprises the step of firstly moving said objective lens at a first moving speed corresponding to the first linear velocity;

said receiving step comprises the step of firstly receiving the plurality of reflection lights associated with the change of said relative distance in said firstly moving step;

said focus error generating step comprises the step of firstly generating the plurality of focus error signals on the basis of the reflection lights received by said firstly receiving step;

said method further comprises the step of firstly calculating the peak values of the focus error signals respectively generated by said firstly generating step;

said judging step comprises the steps of judging said optical record medium as said first optical record medium if at least one of the peak values calculated by said firstly calculating step is equal to or higher than the predetermined standard level, and judging said optical record medium as said second optical record medium if all of the peak values calculated by said firstly calculating step are lower than the predetermined standard level;

said setting step comprises the step of firstly setting the focus servo gain and the focus servo frequency band on the basis of a highest peak value of the peak values calculated by said firstly calculating step, if said optical record medium is judged as said first optical record medium;

said moving step further comprises the step of secondly moving said objective lens at a second moving speed, which corresponds to the second linear velocity and which is lower than the first moving speed, if said optical record medium is judged as said second optical record medium;

said receiving step further comprises the step of secondly receiving the plurality of reflection lights associated with the change of said relative distance in said secondly moving step;

said focus error generating step further comprises the step of secondly generating the plurality of focus error signals on the basis of the reflection lights received by said secondly receiving step;

said method further comprises the step of secondly calculating the peak values of the focus error signals respectively generated by said secondly generating step; and said setting step comprises the step of secondly setting the focus servo gain and the focus servo frequency band on the basis of a highest peak value of the peak values calculated by said secondly calculating step.

6. A method according to claim 5, wherein, in said irradiating step, said first light beam is a 0 order light generated by a bifocal lens, and said second light beam is a +1 order light generated by said bifocal lens.

7. An optical record medium judging apparatus for judging types of optical record mediums, which distances from external surfaces thereof to information record surfaces thereof recorded with record information are different from each other, said apparatus comprising:

a light irradiating means for irradiating an information record surface of an optical record medium to be reproduced with a plurality of light beams to be focused on different positions on one optical axis;

a lens moving means for moving, so as to change a relative distance parallel to said one optical axis between an objective lens for prescribing focal points of said plurality of light beams respectively and said information record surface, said objective lens;

a light receiving means for receiving a plurality of reflection lights of said plurality of light beams reflected from said information record surface respectively, associated with a change of said relative distance;

a focus error generating means for generating a plurality of focus error signals on the basis of said plurality of received reflection lights respectively; and a judging means for judging a type of said optical record medium by comparing levels of the generated focus error signals respectively with a predetermined standard level.

8. An apparatus according to claim 7, wherein:

said optical record mediums comprise first and second optical record mediums which distances from the external surfaces thereof to the information record surfaces thereof are different from each other;

said light irradiating means comprises means for irradiating the information record surface with a first light beam to reproduce the record information from said first optical record medium, and irradiating the information record surface with a second light beam to reproduce the record information from said second optical record medium, said second light beam having a focal point farther from said objective lens than said first light beam;

said light receiving means comprises a first receiving means for receiving a first reflection light of said first light beam reflected from the information record surface, and a second receiving means for receiving a second reflection light of said second light beam reflected from the information record surface;

said focus error signal generating means comprises a first generating means for generating a first focus error signal on the basis of the received first reflection light, and a second generating means for generating a second focus error signal on the basis of the received second reflection light; and said type judging means comprises a first judging means for judging the type of said optical record medium as said first optical record medium if at least one of the levels of said first and second focus error signals is equal to or higher than the predetermined standard level, and a second judging means for judging the type as said second optical record medium if both of the levels are lower than the predetermined standard level.

9. An apparatus according to claim 8, wherein, in said light irradiating means, said first light beam is a 0 order light generated by a bifocal lens, and said second light beam is a +1 order light generated by said bifocal lens.

10. A focus servo controlling apparatus for judging types of optical record mediums, on which record informations are recorded at linear velocities different from each other, and setting a focus servo gain and a focus servo frequency band corresponding to each of the types of said optical record mediums, said apparatus comprising:

a light irradiating means for irradiating an information record surface recorded with record information of an optical record medium to be reproduced with a plurality of light beams to be focused on different positions on one optical axis;

a lens moving means for moving, so as to change a relative distance parallel to said one optical axis between an objective lens for prescribing focal points of said plurality of light beams respectively and said information record surface, said objective lens on the basis of a control signal;

a light receiving means for receiving a plurality of reflection lights of said plurality of light beams reflected from said information record surface respectively, associated with a change of said relative distance;

a focus error generating means for generating a plurality of focus error signals on the basis of said plurality of received reflection lights respectively;

a type judging means for judging a type of said optical record medium by comparing peak values of the generated focus error signals respectively with a predetermined standard level;

a servo setting means for setting the focus servo gain and the focus servo frequency band on the basis of the peak values; and a control signal generating means for generating the control signal, wherein said servo setting means sets the focus servo gain and the focus servo frequency band by repeating following operations with respect to the linear velocities of said optical record mediums one after another:

firstly, said control signal generating means generates the control signal to move said objective lens at a moving speed corresponding to a fastest linear velocity among the linear velocities;

said servo setting means sets the focus servo gain and the focus servo frequency band on the basis of a peak value of a focus error signal generated by moving said objective lens at the moving speed corresponding to the fastest linear velocity, if the judged type of said optical record medium is one recorded with the record information at the fastest linear velocity;

secondly, if the judged type of said optical record medium is not one recorded with the record information at the fastest linear velocity, said control signal generating means generates the control signal to move said objective lens at a moving speed corresponding to a second fastest linear velocity among the linear velocities; and said servo setting means sets the focus servo gain and the focus servo frequency band on the basis of a peak value of a focus error signal generated by moving said objective lens at the moving speed corresponding to the second fastest linear velocity, if the judged type of said optical record medium is one recorded with the record information at the second fastest linear velocity.

11. An apparatus according to claim 10, wherein:

said optical record mediums comprise a first optical record medium, on which the record information is recorded at a first linear velocity, and a second optical record medium, on which the record information is recorded at a second linear velocity lower than the first linear velocity and which distance from the external surface thereof to the information record surface thereof is different from that of said first optical record medium;

said lens moving means comprises a first moving means for firstly moving said objective lens at a first moving speed corresponding to the first linear velocity;

said light receiving means comprises a first receiving means for firstly receiving the plurality of reflection lights associated with the change of said relative distance of said objective lens moved by said first moving means;

said focus error generating means comprises a first generating means for firstly generating the plurality of focus error signals on the basis of the reflection lights received by said first receiving means;

said apparatus further comprises a first calculating means for firstly calculating the peak values of the focus error signals respectively generated by said first generating means;

said type judging means comprises a first judging means for judging said optical record medium as said first optical record medium if at least one of the peak values calculated by said first calculating means is equal to or higher than the predetermined standard level, and a second judging means for judging said optical record medium as said second optical record medium if all of the peak values calculated by said first calculating means are lower than the predetermined standard level;

said servo setting means comprises a first setting means for firstly setting the focus servo gain and the focus servo frequency band on the basis of a highest peak value of the peak values calculated by said first calculating means, if said optical record medium is judged as said first optical record medium;

said lens moving means further comprises a second moving means for secondly moving said objective lens at a second moving speed, which corresponds to the second linear velocity and which is lower than the first moving speed, if said optical record medium is judged as said second optical record medium;

said light receiving means further comprises a second receiving means for secondly receiving the plurality of reflection lights associated with the change of said relative distance of said objective lens moved by said second moving means;

said focus error generating means further comprises a second generating means for secondly generating the plurality of focus error signals on the basis of the reflection lights received by said second receiving means;

said apparatus further comprises a second calculating means for secondly calculating the peak values of the focus error signals respectively generated by said second generating means; and said servo setting means comprises a second setting means for secondly setting the focus servo gain and the focus servo frequency band on the basis of a highest peak value of the peak values calculated by said second calculating means.

12. An apparatus according to claim 11, wherein, in said light irradiating means, said first light beam is a 0 order light generated by a bifocal lens, and said second light beam is a +1 order light generated by said bifocal lens.

* * * * *